(12) United States Patent
Kelly et al.

(10) Patent No.: US 7,207,879 B2
(45) Date of Patent: Apr. 24, 2007

(54) CARCASS PROCESSING APPARATUS

(75) Inventors: Paul Kelly, Danbury (GB); Nigel Cope, Oxon (GB)

(73) Assignee: C & C Systems Limited, Oxon (GB)

( * ) Notice: Subject to any disclaimer, the term of this patent is extended or adjusted under 35 U.S.C. 154(b) by 0 days.

(21) Appl. No.: 10/497,961

(22) PCT Filed: Dec. 2, 2002

(86) PCT No.: PCT/GB02/05439

§ 371 (c)(1),
(2), (4) Date: Jun. 1, 2004

(87) PCT Pub. No.: WO03/047357

PCT Pub. Date: Jun. 12, 2003

(65) Prior Publication Data

US 2005/0250432 A1    Nov. 10, 2005

(30) Foreign Application Priority Data

Nov. 30, 2001 (GB) ................... 0128787.9
Oct. 11, 2002 (GB) ................... 0223716.2

(51) Int. Cl.
*A22C 21/04* (2006.01)
(52) U.S. Cl. ...................... 452/77
(58) Field of Classification Search .............. None
See application file for complete search history.

(56) References Cited

U.S. PATENT DOCUMENTS

| | | | | |
|---|---|---|---|---|
| 3,703,021 A | * | 11/1972 | Sharp | 452/77 |
| 4,653,148 A | * | 3/1987 | Getz | 452/73 |
| 4,731,908 A | * | 3/1988 | Thorsen | 452/74 |
| 4,965,911 A | * | 10/1990 | Davey | 452/173 |
| 5,045,021 A | * | 9/1991 | Borup | 452/74 |

\* cited by examiner

*Primary Examiner*—Thomas Price
(74) *Attorney, Agent, or Firm*—John Wiley Horton

(57) ABSTRACT

An apparatus for processing carcasses of gallinaceous animals, including a conveyor line 3 from which, in operation, carcasses are suspended by their legs, a heating cabinet 1 through which the carcasses are transported on the conveyor line 3 the heating cabinet 1 including hot air means 10, 11, 15 to project a flow of hot air onto the carcasses to warm the outer surface on the carcasses to thereby loosen the feathers.

51 Claims, 2 Drawing Sheets

CARCASS PROCESSING APPARATUS

Figure 1:
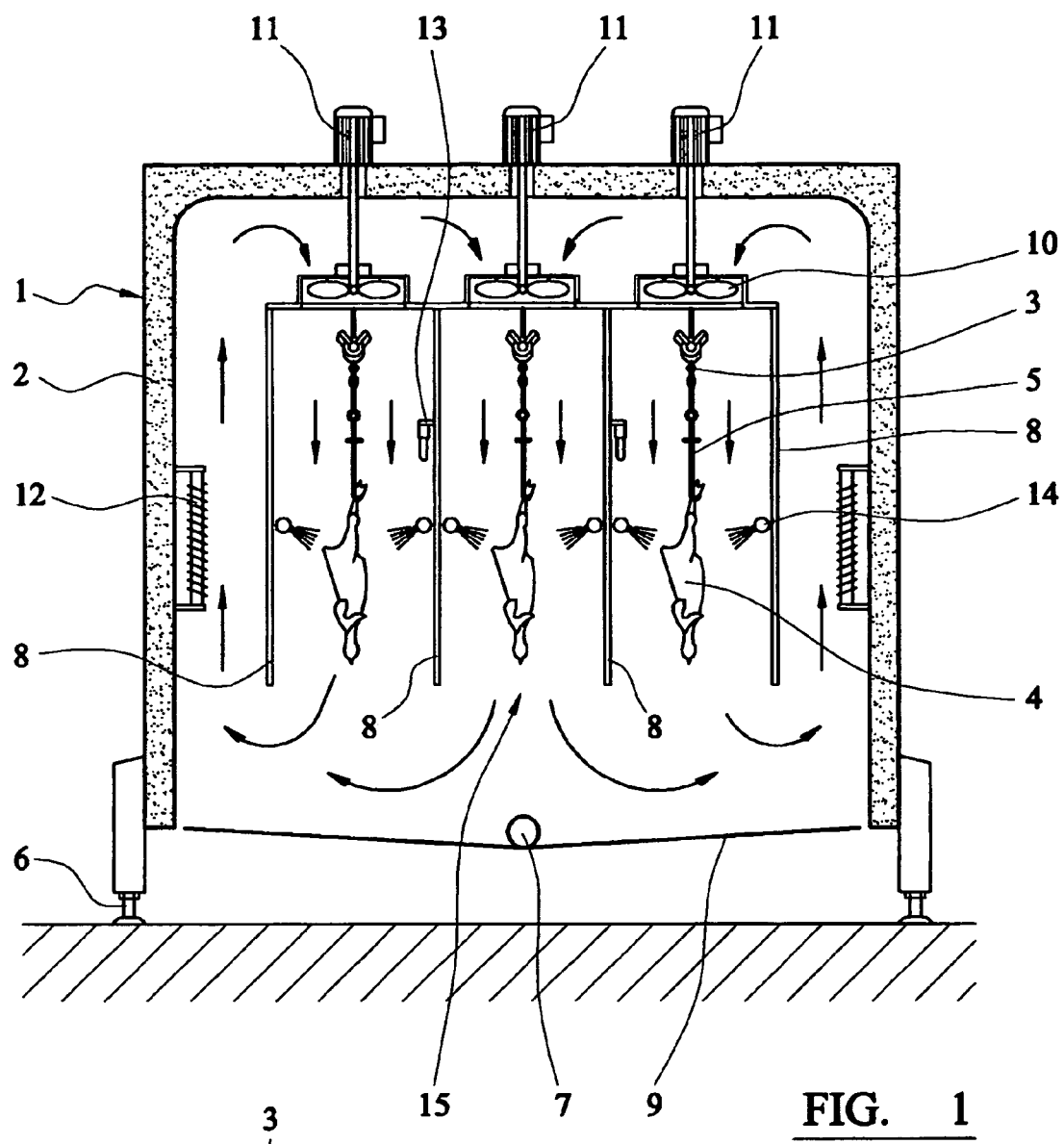

This invention relates to apparatus for processing carcasses of gallinaceous animals, particularly but not exclusively, chickens and turkeys.

A conventional process for processing the carcasses of chickens, for example, includes the steps of first suspending the animals by their feet on an overhead conveyor line, stunning the animals, slitting their throats and passing them through a bleeding station where the blood drains out. Thereafter, the carcasses are passed through a hot water tank which serves to heat the outer surface of the carcass to loosen the feathers, prior to passing the carcasses through a plucking machine which removes the feathers.

This known process has a number of disadvantages. The principal disadvantage is relatively poor hygiene since, as all carcasses pass through the same hot water tank, there is a substantial risk of cross-contamination. To reduce this risk it is necessary to ensure on that bleeding of the carcasses has terminated before they enter the water. This has the disadvantage that the carcasses cool down, which means that they must spend longer in the water for their outer surfaces to be heated up again, before they enter the plucking machine. Additionally, to reduce the risk of fouling or cross-contamination, the water in the tank must be cleaned and/or replaced and reheated regularly, which increases the cost of processing. Further, the requirement for bleeding to be completed before the carcasses enter the hot water tank inevitably means that the bleeding station must be relatively larger than is necessary and it must be spaced from the hot water tank, which necessitates a relatively large amount of factory floor space for the apparatus.

The present invention seeks to provide an improved apparatus for processing carcasses which overcomes or reduces the disadvantages of the known process and provides a more compact and cost-effective process which produces a better product.

According to the present invention there is provided apparatus for processing carcasses of gallinaceous animals, including a conveyor line from which, in operation, carcasses are suspended by their feet, a heating zone through which the carcasses are transported on the conveyor line, the heating zone including hot air means to project a flow of hot air onto the carcasses to warm the outer surface of the carcasses to thereby loosen the feathers.

Preferably, the hot air is directed generally downwardly to penetrate the feathers through to the skin onto the carcasses for a predetermined period which may be for between four and six minutes, depending on the size of the bird. The air is preferably recirculated round the heating zone.

In a preferred embodiment, a water mist spray is provided in the heating zone to lay dust and feathers which fall out of the carcasses. The conveyor line preferably follows a serpentine path through the cabinet. Preferably, the heating zone is contained in a substantially closed cabinet, which is insulated against the loss of heat. The cabinet may have a bleeding station immediately adjacent to the inlet where the carcasses enter the cabinet and may have a plucking machine positioned immediately adjacent the outlet where the carcasses leave the heating zone.

Figure 2:
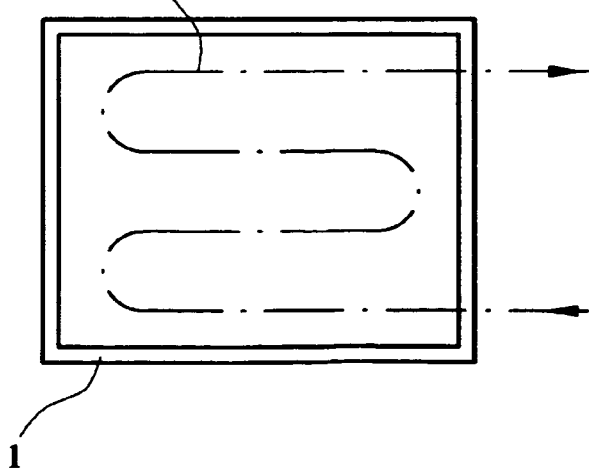
Figure 3:
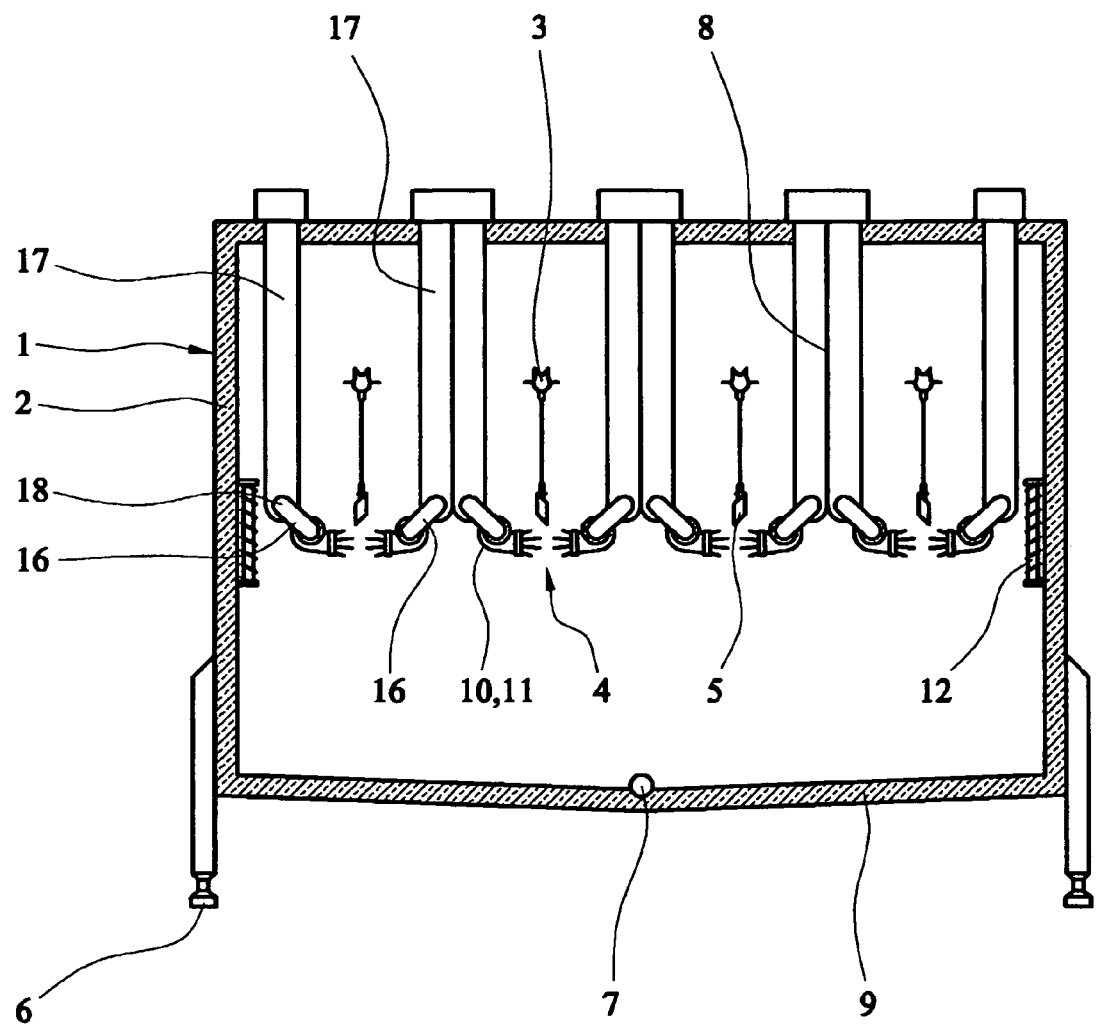

Preferred embodiments of the present invention will now be described, by way of example, with reference to the accompanying drawing, in which:

FIG. 1 shows an end view of a heating cabinet, and
FIG. 2 shows a schematic plan view of a heating cabinet.
FIG. 3 shows a cross-section through the heating cabinet of FIG. 1.

Referring now to FIG. 1 of the drawings, there is shown a cross-sectional view of a heating cabinet 1 for incorporation in a carcass processing plant for processing, in particular, chickens. It will be appreciated that other types of gallinaceous animals, such as turkeys and ducks, may also be processed in this apparatus.

The heating cabinet 1 consists of an outer casing incorporating a layer of heat insulating material 2 through which cabinet an overhead conveyor line 3 passes from an inlet (not shown) to an outlet (not shown) following a serpentine path through the cabinet. FIG. 2 shows, schematically, a plan view of a typical serpentine path. The cabinet 1 is essentially self-contained being mounted on adjustable feet 6. In this way, no significant structural work is required to the factory floor when installing the apparatus and flexibility is maintained if it is subsequently desired to move the cabinet to a different position.

The heating cabinet 1 includes a waste outlet shown schematically as reference 7 through which dust, feathers and other debris is removed from the cabinet. The waste outlet 7 may include a water channel to assist in the removal of the debris and the floor of the cabinet slopes down towards this outlet. The conveyor line 3 and carcasses suspended therefrom is enclosed by sidewalls 8 which depend from a position near the top of the cabinet to a position spaced from the floor to form a substantially closed channel open at its bottom end. At the upper ends, the sidewalls 8 are connected to fans 10 driven by appropriate electric motors 11 which drive hot air downwardly through the closed channel formed by the side walls. On exiting the closed channel at the open lower end 15, the hot air passes upwardly to the top of the heating cabinet for recirculation by the fans 10. The heating cabinet 1 includes heaters 12 to heat the air being recirculated. The channel includes, at intervals, thermostats 13 which measure the temperature in the channel. The channel also includes, at spaced intervals, water mist sprayers 14 which spray a fine mist downwardly in the channel to entrain dust and to assist the downward movement of feathers dislodged from the carcasses.

The fact that the hot air is directed downwardly onto the carcasses has the advantage that it is in a direction opposite to the natural lie of the feathers so to enter between feathers to assist in opening them out and allowing the hot air to impinge on the surface of the carcass. The fact that the air exits the lower ends of the channels and then passes through a directional change of 180 degrees before passing upwardly assists in the separation of dust and stray matter from the air flow since, as its weight is inevitably more than air, its mass inertia tends to keep it falling to the bottom of the cabinet in the manner of a centrifugal filter. Baffles may be provided to assist this directional change of the airflow.

FIG. 3 illustrates an alternative embodiment utilising hot air jets and shows four lengths of the conveyor line as it follows its serpentine path through the heating cabinet. Each length of conveyor line has opposed air jets 16 which are located adjacent carcasses passing along the conveyor line and are arranged to direct a high-pressure jet of air onto the carcasses passing along the conveyor so as to enter between the feathers. The jet or jets is/are directed generally downwardly onto the carcasses against the lie of the feathers as this tends to open the feathers out and facilitates the hot jet of air contacting the skin of the carcass. Each air jet is connected to a hot air supply passage 17, through which hot air recirculated from the cabinet is supplied to the air jets. The orientation of the air jets is adjustable by pivoting the air jets about their axes where they are connected to the hot air supply passage 17 to enable the air jets to be adjusted to accommodate the different sizes of bird passing along the conveyor line. The jets are grouped together in a small array in an air jet unit pivotally mounted on the hot air passage 17. The position of the carcasses relative to the jets may be determined by the provision of an appropriate length of the shackle by which the carcass is suspended.

It has been found that the supply of high-pressure, narrow jets of hot air to the carcasses improves the plucking effect since the hot air has a greater efficiency in penetrating to the skin of the carcass.

To further improve the penetration of hot air to the skin of the carcass, the carcass may be subjected to a pre-plucking process using conventional plucking fingers which removes approximately 30 percent of the feathers and alters the set of the remaining feathers to facilitate the flow of hot air towards the skin.

Carcasses to be processed are suspended by their legs from the conveyor line on shackles 5 in a known manner. As mentioned earlier, the carcasses are first stunned and then have their throats slit as they pass through a bleeding station. In the present apparatus, the bleeding station may be positioned adjacent to the inlet to the heating cabinet 1 since it is no longer essential for bleeding to be terminated before the carcasses enter the heating stage. It is envisaged that the majority of bleeding will take place before the carcasses enter the heating cabinet 1 but, since the carcasses do not touch each other and are not in touch with a common fluid like the water in a hot water tank which would take up any stray blood on a carcass, and hence increase the risk of cross-contamination, some bleeding can take place in the heating cabinet. The bleeding station can therefore be located immediately adjacent the inlet to the heating cabinet which not only reduces the space taken by the installation, but loss of heat from the carcasses is kept to a minimum. The carcasses can therefore be processed much faster than with the known method and the reduction in temperature changes in the processing and the increased speed of processing results in a better quality end product.

Although not shown, additional filters may be included in the cabinet 1 at the inlet to the fans. It will be understood that the fans and drive arrangement illustrated is by way of example only and may be in the form of a duct arrangement using just one or two powerful fans located at intervals along with the serpentine path. The dwell time for carcasses within the cabinet depends upon the type and size of the carcasses to be the feathered but typically, would be between four and six minutes.

The use of the present invention has the added advantage that the size of the bleeding station may be reduced compared with the known installations. It is envisaged that no hot water tank need be provided although it is possible that in certain circumstances and installations a small hot water tank may be retained to dip the wings which are more difficult for the hot air to raise in temperatures.

Having described our invention, we claim:

1. An apparatus for processing carcasses of gallinaceous animals, including a conveyor line from which, in operation, said carcasses are suspended by their feet, a heating zone through which said carcasses are transported on said conveyor line, said heating zone including hot air means to project jets of hot air onto said carcasses to warm the outer surface of said carcasses to thereby loosen the feathers, wherein said jets of hot air are directed generally downwardly onto said carcasses against the lie of said feathers.

2. An apparatus according to claim 1, wherein said hot air is directed generally downward onto said carcasses.

3. An apparatus according to claim 2, wherein said hot air is recirculated round said heating zone.

4. An apparatus according to claim 3, wherein after passing over said carcasses, said hot air flow is deflected substantially through 180 degrees to pass upwardly to the top of said heating zone, for recirculation.

5. An apparatus according to claim 4, wherein said hot air means comprises at least one hot air jet located adjacent to the path of said carcasses through said heating zone.

6. An apparatus according to claim 4, wherein said hot air means comprises a plurality of hot air jets on both sides of the path of said carcasses through said heating zone.

7. An apparatus according to claim 4, wherein said hot air means comprises a plurality of hot air jets mounted in an array in an air jet unit.

8. An apparatus according to claim 4, wherein said hot air means comprises at least one hot air jet located adjacent to the path of said carcasses through said heating zone, and wherein the angular relationship between said at least one hot air jet and said path is adjustable.

9. An apparatus according to claim 4, further comprising a pre-plucking zone adjacent to said heating zone to subject said carcasses to an initial pre-plucking process before said carcasses enter said heating zone.

10. An apparatus according to claim 5, wherein said at least one hot air jet is positioned to be directed generally downward onto said carcasses against the lie of the feathers.

11. An apparatus according to claim 4, wherein a water mist spray is provided in said heating zone to lay dust and feathers which fall out of said carcasses.

12. An apparatus according to claim 3, wherein said hot air means comprises at least one hot air jet located adjacent to the path of said carcasses through said heating zone.

13. An apparatus according to claim 12, wherein said at least one hot air jet is positioned to be directed generally downward onto said carcasses against the lie of the feathers.

14. An apparatus according to claim 3, wherein said hot air means comprises a plurality of hot air jets on both sides of the path of said carcasses through said heating zone.

15. An apparatus according to claim 3, wherein said hot air means comprises a plurality of hot air jets mounted in an array in an air jet unit.

16. An apparatus according to claim 3, wherein said hot air means comprises at least one hot air jet located adjacent to the path of said carcasses through said heating zone, and wherein the angular relationship between said at least one hot air jet and said path is adjustable.

17. An apparatus according to claim 3, further comprising a pre-plucking zone adjacent to said heating zone to subject said carcasses to an initial pre-plucking process before said carcasses enter said heating zone.

18. An apparatus according to claim 3, wherein a water mist spray is provided in said heating zone to lay dust and feathers which fall out of said carcasses.

19. An apparatus according to claim 2, wherein said hot air means comprises at least one hot air jet located adjacent to the path of said carcasses through said heating zone.

20. An apparatus according to claim 19, wherein said at least one hot air jet is positioned to be directed generally downward onto said carcasses against the lie of the feathers.

21. An apparatus according to claim 2, wherein said hot air means comprises a plurality of hot air jets on both sides of the path of said carcasses through said heating zone.

22. An apparatus according to claim 2, wherein said hot air means comprises a plurality of hot air jets mounted in an array in an air jet unit.

23. An apparatus according to claim 2, wherein said hot air means comprises at least one hot air jet located adjacent to the path of said carcasses through said heating zone, and wherein the angular relationship between said at least one hot air jet and said path is adjustable.

24. An apparatus according to claim 2, further comprising a pre-plucking zone adjacent to said heating zone to subject said carcasses to an initial pre-plucking process before said carcasses enter said heating zone.

25. An apparatus according to claim 2, wherein a water mist spray is provided in said heating zone to lay dust and feathers which fall out of said carcasses.

26. An apparatus according to claim 1, wherein said hot air is recirculated round said heating zone.

27. An apparatus according to claim 26, wherein said hot air means comprises at least one hot air jet located adjacent to the path of said carcasses through said heating zone.

28. An apparatus according to claim 27, wherein said at least one hot air jet is positioned to be directed generally downward onto said carcasses against the lie of the feathers.

29. An apparatus according to claim 26, wherein said hot air means comprises a plurality of hot air jets on both sides of the path of said carcasses through said heating zone.

30. An apparatus according to claim 26, wherein said hot air means comprises at least one hot air jet located adjacent to the path of said carcasses through said heating zone, and wherein the angular relationship between said at least one hot air jet and said path is adjustable.

31. An apparatus according to claim 26, further comprising a pre-plucking zone adjacent to said heating zone to subject said carcasses to an initial pre-plucking process before said carcasses enter said heating zone.

32. An apparatus according to claim 26, wherein a water mist spray is provided in said heating zone to lay dust and feathers which fall out of said carcasses.

33. An apparatus according to claim 1, wherein said hot air means comprises at least one hot air jet located adjacent to the path of said carcasses through said heating zone.

34. An apparatus according to claim 33, wherein said at least one hot air jet is positioned to be directed generally downward onto said carcasses against the lie of the feathers.

35. An apparatus according to claim 1, wherein said hot air means comprises a plurality of hot air jets on both sides of the path of said carcasses through said heating zone.

36. An apparatus according to claim 1, wherein said hot air means comprises a plurality of hot air jets mounted in an array in an air jet unit.

37. An apparatus according to claim 1, wherein said jets of hot air are projected by a plurality of hot air jets mounted in an array in at least one hot air jet unit.

38. An apparatus according to claim 37, wherein said plurality of hot air jets deliver fast, pressurized streams of air sufficient to penetrate between said feathers and lift said feathers away from said carcasses.

39. An apparatus according to claim 37, wherein said hot air is delivered to said at least one hot air jet unit by at least one hot air supply passage, wherein said hot air supply passage is segregated from said heating zone so that said hot air is delivered to said hot air jet unit rather than to said heating zone in general.

40. An apparatus according to claim 39, wherein after said hot air passes through said jets and against said carcasses, said hot air is collected and recirculated through said hot air means to said jets.

41. An apparatus according to claim 1, wherein said hot air means comprises at least one hot air jet located adjacent to the path of said carcasses through said heating zone, and wherein the angular relationship between said at least one hot air jet and said path is adjustable.

42. An apparatus according to claim 1, further comprising a pre-plucking zone adjacent to said heating zone to subject said carcasses to an initial pre-plucking process before said carcasses enter said heating zone.

43. An apparatus according to claim 1, wherein a water mist spray is provided in said heating zone to lay dust and feathers which fall out of said carcasses.

44. An apparatus according to claim 1, wherein said conveyor line follows a serpentine path through said heating zone.

45. An apparatus according to claim 1, wherein said heating zone is contained in a substantially closed cabinet, which is insulated against the loss of heat.

46. An apparatus according to claim 1, further including a bleeding station positioned proximate the point where said carcasses enter said heating zone.

47. An apparatus according to claim 1, further including a plucking machine positioned proximate the point where said carcasses leave said heating zone.

48. An apparatus according to claim 1, wherein said carcasses are subjected to said flow of hot air for a predetermined period of between four and six minutes.

49. An apparatus according to claim 1, wherein said jets of hot air deliver a fast, pressurized air stream sufficient to penetrate between said feathers and lift said feathers away from said carcasses.

50. An apparatus according to claim 49, wherein said hot air is delivered to said jets of hot air by at least one hot air supply passage, wherein said hot air supply passage is segregated from said heating zone so that said hot air is delivered to said jets rather than to said heating zone in general.

51. An apparatus according to claim 50, wherein after said hot air passes through said jets and against said carcasses, said hot air is collected and recirculated through said hot air means to said jets.

* * * * *